United States Patent [19]

Andersen

[11] Patent Number: 4,546,727

[45] Date of Patent: Oct. 15, 1985

[54] DEVICE FOR PREVENTING OR REDUCING EMITTANCE OF ODORS

[76] Inventor: Ib H. Andersen, Direktorsgatan 22, Helsingborg, Sweden, S-252 46

[21] Appl. No.: 605,940

[22] Filed: May 2, 1984

[30] Foreign Application Priority Data

May 4, 1983 [SE] Sweden ................ 8302541

[51] Int. Cl.⁴ .................................. A01K 29/00
[52] U.S. Cl. ...................................... 119/1
[58] Field of Search ............ 119/1, 19; 4/111.1, 4/111.6, 453

[56] References Cited

U.S. PATENT DOCUMENTS

| | | | |
|---|---|---|---|
| 3,332,397 | 7/1967 | Vander Wall | 119/1 |
| 3,486,173 | 12/1969 | Youngblood et al. | 4/453 |
| 3,885,523 | 5/1975 | Coleman | 119/1 |
| 3,924,571 | 12/1975 | Holman | 119/19 X |
| 4,095,559 | 6/1978 | Griffith | 119/1 |

FOREIGN PATENT DOCUMENTS 339887  7/1971  Sweden .

*Primary Examiner*—Robert P. Swiatek
*Attorney, Agent, or Firm*—Bacon & Thomas

[57] ABSTRACT

A device for preventing or reducing emittance of odors from moisture-absorbent material to the environment whereby the moisture-absorbent material is intended for receiving animal excrements and urine. The device comprises an air stream generator which penetrates air streams through the moisture-absorbent material, and a bottom for supporting the moisture-absorbent material, the bottom having apertures through which air streams from the air stream generator pass before or after passing through the moisture-absorbent material.

10 Claims, 2 Drawing Figures

DEVICE FOR PREVENTING OR REDUCING EMITTANCE OF ODORS

BACKGROUND OF THE INVENTION

1. Field of the Invention

The present invention relates to a device for preventing or reducing emittance of odors from moisture—absorbent material to the environment, whereby the moisture—absorbent material is intended for receiving animal excrements and urine.

2. Description of the Prior Art

Litter boxes for cats and cages for smaller pets such as guinea-pigs, hamsters, mice, etc., wherein moisture—absorbent material is provided for absorbing excrements and urine from the animals and prevent or reduce spreading of odors from the litter box or cage, are already known in the art. In order to further reduce spreading of odors from the litter box or cage, increased ventilation or distribution of deodorizers in the box or cage has been suggested. However, these measures are insufficient inasmuch as if the moisture—absorbent material is not frequently replaced, odors will in a very short time be spread from the litter box or cage, since the moisture—absorbent material can not absorb more moisture.

SUMMARY OF THE INVENTION

The object of the present invention is to eliminate the above drawbacks and in a simple manner provide a device of the aforementioned type which also without replacement of the moisture—absorbent material extensively prevents spreading of odors from e.g. the litter box or cage, and that this is possible without using deodorizers or similar substances. This is arrived at according to the invention by providing the device with means for generating air streams which penetrate through the moisture—absorbent material, and with a bottom for the moisture—absorbent material, said bottom having apertures through which streams from said means for generating air streams pass before or after passing through the moisture—absorbent material.

BRIEF DESCRIPTION OF THE DRAWINGS

The invention will now be further described with reference to the accompanying drawings, wherein.

DETAILED DESCRIPTION OF THE PREFERRED EMBODIMENT

Figure 1:
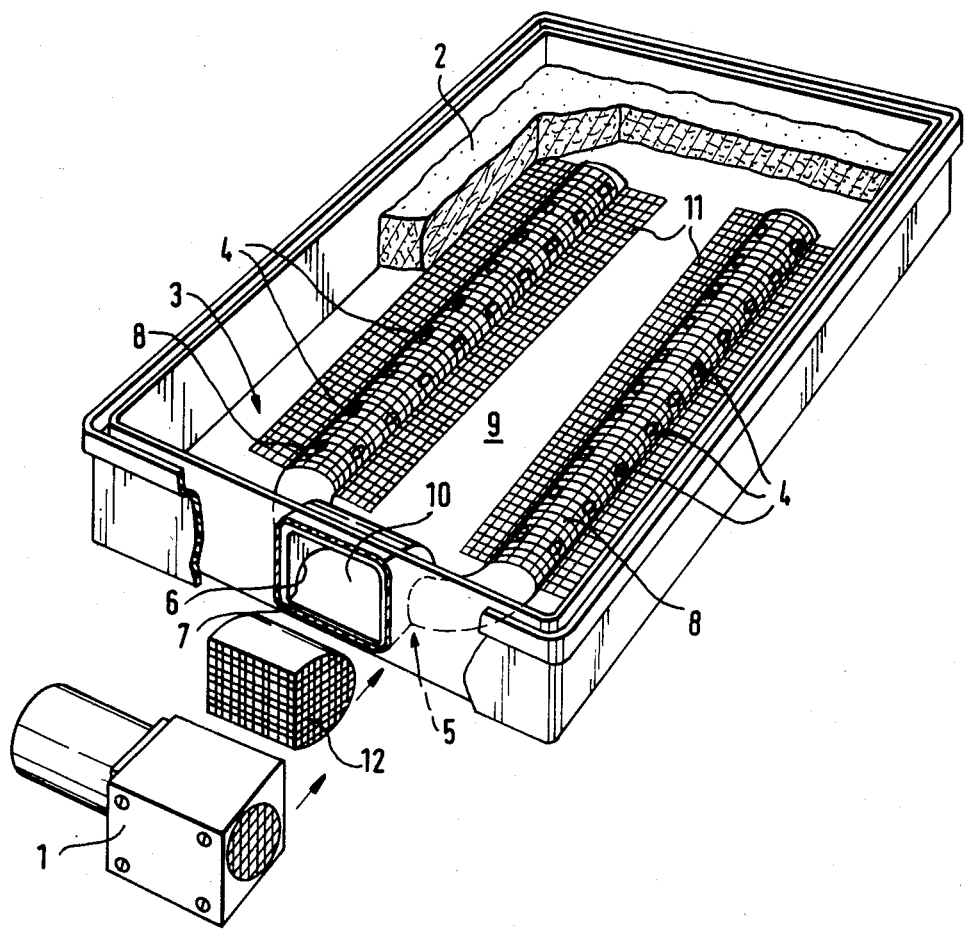
FIG. 1 is a perspective view of an embodiment of a litter box for cats provided with a device according to the invention.

Thus, FIG. 1 illustrates a litter box of conventional type, wherein indoor cats exercise their natural bodily functions. These litter boxes are at the bottom provided with a layer of moisture—absorbent material, i.e. litter or preferably a special type of gravel, for sucking up urine and moisture in the excrements and preventing spread of the odor therefrom. However, after a relatively short time of period, the moisture—absorbent material needs to be replaced since it has lost its moisture—absorbing ability.

In order to prevent or reduce emittance of odors from the moisture—absorbent material, also after a longer time of use and substantially without requiring any replacement of the moisture—absorbent material, the litter box according to FIG. 1 is provided with a device comprising means 1 for generating air streams which penetrate through the moisture—absorbent material 2 and a bottom 3 for supporting moisture—absorbent material, said bottom having apertures 4 through which air streams from said means for generating air streams pass before or after passing through the moisture—absorbent material. Thus, said means 1 for generating air streams generates air streams by means of pressure and the preferably consists of e.g. an aquarium pump of conventional type and appropriate size and effect, which pumps air through the apertures 4 and into the moisture—absorbent material 2, or by means of suction, whereby the air streams flow in the opposite direction. Said means 1 for generating air streams, which may be mounted at any suitable location on the litter box, communicates with said apertures 4 through conduit means 5 provided in the bottom 3. In the embodiment of FIG. 1, the conduit means 5 comprises two passages 6 extending in the longitudinal direction of the bottom 3. The apertures 4 are provided in said passages 6, which are joined into a common passage portion 7 connected to said means 1 for generating air streams. In the preferred embodiment, the passages 6 are preferably formed by semi-circular elevations 8 in the upper layer 9 of two layers 9 and 10 joined together to form the bottom 3. The apertures 4 are provided in the lowest portion of said elevations 8 and furthermore, also when the generated air streams have no power to blow away the moisture—absorbent material or suck it into the apertures, are covered with a prior art fabric 11 pervious to air but not to said material.

The flow of air through the moisture—absorbent material permits quick drying of urine and moisture in the cat excrements. The time in which the moisture—absorbent material is usable is substantially increased and the material needs to be replaced only by the amount removed from the excrements by hand. Hereby, the costs for the material are lowered and there is nothing left in the litter box that might emit any odor.

To further improve the effect of preventing or reducing emittance of odor of the device according to the invention, said device may further comprise filter means for purifying the air after its passage through the moisture—absorbent material. In the embodiment of FIG. 1, said filter means comprises a coal screen 12 preferably located in the passage portion 7 for collecting contaminants from the moisture—absorbent material 2, carried by the air through the apertures 4, before the air reaches the means 1 for generating air streams which thus, in this embodiment, provides a suction force, and out into the environment. Hereby, the structure is very simple and the filter is easily replaceable.

Figure 2:
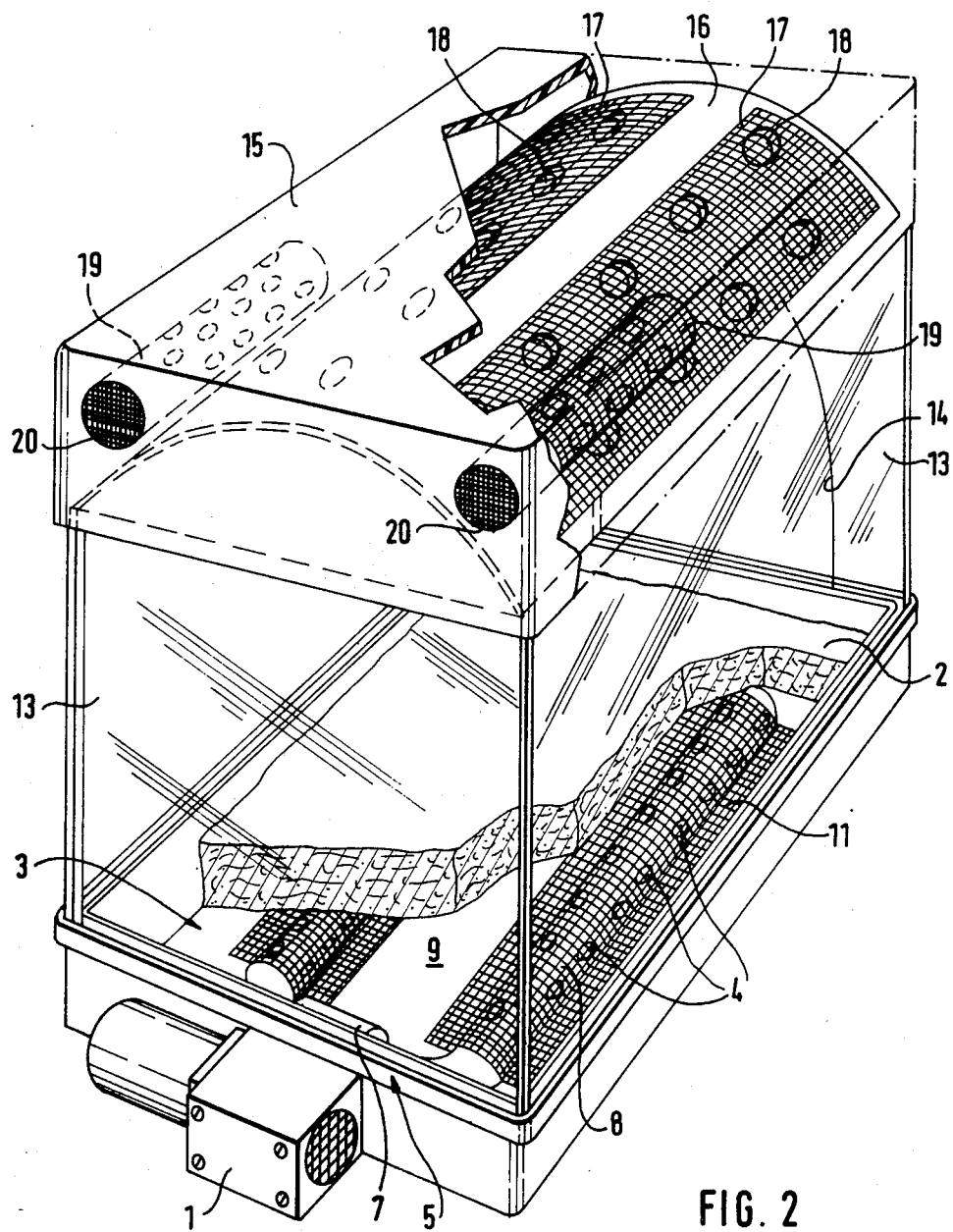
FIG. 2 is a perspective view of a second embodiment of a litter box for cats or a cage provided with a device according to the invention.

FIG. 2 illustrates another embodiment of the filter means. Since the bottom 3 here is provided with side walls 13 having one or more entrance and exit openings 14 and an upper portion 15 arranged on top of the side walls, the litter box may be used for transport or, if the side walls are partially or completely made of a net, as a cage for e.g. guinea-pigs, hamsters or mice. According to FIG. 2, the filter means comprises an inner ceiling 16 mounted in the upper portion 15 and having apertures 18 covered by a fabric 17 pervious to air but not to material. This part of the filter means is preferably used when the side walls 13 are unbroken and serves to see that small particles from the moisture—absorbent material, eventually carried by the air streams, remain in the box. The inner ceiling 16 is preferably arcuate in shape to facilitate assembly and disassembly thereof and during maintenance of sufficient air passage, to permit formation of apertures 20 provided with a coal screen 19 in at least one of the side walls 13 (and/or in the upper portion 15) for forming a second part of the filter means and having the same purpose as the coal screen 12 in the embodiment of FIG. 1. The air streams from the means 1 for generating air streams, here preferably a pump, are thus, after passage though the moisture—absorbent material 2 are, for the most part, forced through the apertures 18 in the inner ceiling 16 and then out through the apertures 20 with the coal screens 19. Both filter structures described above permit an effective purification of the air streams flowing through the moisture—absorbent material and is an excellent complement to the other member of the device, especially if the box is used by more than one cat.

Cost and manufacturing considerations for litter boxes for cats, as described above and shown in the drawings, or cages or similar products having a device according to the present invention, are preferably made of plastic material even if other materials are used. Other changes or modifications are also allowed within the scope of the following claims. Thus, the conduit means 5 may comprise any desired number of passages 6 and apertures 4 respectively, arranged to give optimal effect. The number of filter apertures 18, 20 and their location may also vary as well as the number and shape of the coal screens 12, 19. As indicated above, the structure and location of the means 1 for generating air streams is not critical to the invention as long as said means is in operative communication with the apertures 4 in the bottom 3.

I claim:

1. A device for preventing or reducing emittance of odors from moisture absorbent material to the environment, whereby the moisture absorbent material is intended for receiving animal excrements and urine, which device comprises means for generating an air stream which penetrates through the moisture absorbent material, a bottom for supporting the moisture absorbent material, a conduit means carried by the bottom and in communication with the air stream generating means, and the conduit means including at least two passages extending longitudinally of the bottom and provided with a plurality of apertures through which the air stream may pass either before or after passing through the moisture absorbent material.

2. The device of claim 1 wherein the bottom is defined by an upper layer and a lower layer, the passages are formed as semicircular elevations in the upper layer, and the apertures are spaced along the lower portions of the elevations.

3. A device for preventing or reducing emittance of odors from moisture absorbent material to the environment, whereby the moisture absorbent material is intended for receiving animal excrements and urine, which device comprises means for generating an air stream which penetrates through the moisture absorbent material, a bottom for supporting the moisture absorbent material, a conduit means carried by the bottom and in communication with the air stream generating means, the conduit means including a plurality of apertures through which the air stream may pass either before or after passing through the moisture absorbent material, a filter means including a least one coal screen for purifying the air stream after its passage through the moisture absorbing material, and wherein the filter means forms a portion of the conduit means that is in common communication with all of the apertures.

4. A device for preventing or reducing emittance of odors from moisture absorbent material to the environment, whereby the moisture absorbent material is intended for receiving animal excrements and urine, the device being of the type including means for generating an air stream which penetrates through the moisture absorbent material, a conduit means in communication with the air stream generating means, and a plurality of apertures in the conduit means, which device comprises a bottom for supporting the moisture absorbent material, the air stream generating means generates a pressurized air stream, and the conduit means being disposed to direct the pressurized air stream through the apertures before it penetrates through the moisture absorbent material.

5. The device of claim 4 wherein the conduit means is defined by a common portion and at least two passages extending substantially longitudinally of the bottom, and the air stream generating means communicates with the apertures through the common portion.

6. The device of claim 5 wherein the bottom is defined by an upper layer and a lower layer, the passages are formed as semicircular elevations in the upper layer, and the apertures are spaced along the lower portions of the elevations.

7. The device of claim 4 further including a fabric covering the apertures, wherein the fabric is pervious to air but impervious to the moisture absorbent material.

8. The device of claim 4 further including a filter means, the bottom including a plurality of side walls provided with at least one entrance opening and one exit opening, an upper portion supported on the top of the side walls, the filter means being disposed for purifying the air stream after its passage through the moisture absorbent material, and an inner ceiling mounted in the upper portion and including at least one aperture covered by a fabric pervious to air but impervious to the moisture absorbent material.

9. The device of claim 8 wherein the filter means further includes at least one aperture in at least one of the side walls, and a coal screen covering the aperture in the side wall.

10. The device of claim 8 wherein the filter means includes at least one aperture in the upper portion, and a coal screen covering the aperture in the upper portion.

* * * * *